United States Patent
Frank

(10) Patent No.: US 6,970,975 B2
(45) Date of Patent: Nov. 29, 2005

(54) METHOD FOR EFFICIENT CACHING AND ENUMERATING OBJECTS IN DISTRIBUTED STORAGE SYSTEMS

(75) Inventor: Shahar Frank, Ramat Hasharon (IL)

(73) Assignee: Exanet Co., New York, NY (US)

( * ) Notice: Subject to any disclaimer, the term of this patent is extended or adjusted under 35 U.S.C. 154(b) by 547 days.

(21) Appl. No.: 10/294,798

(22) Filed: Nov. 15, 2002

(65) Prior Publication Data

US 2004/0098539 A1 May 20, 2004

(51) Int. Cl.[7] .............................................. G06F 12/00
(52) U.S. Cl. ................. 711/118; 711/117; 711/119; 711/120; 711/122; 711/161; 711/162; 707/201; 707/202; 707/203; 707/205; 707/206
(58) Field of Search ....... 711/113–146, 161–162; 707/201–206

(56) References Cited

U.S. PATENT DOCUMENTS

| | | | |
|---|---|---|---|
| 5,539,895 A | | 7/1996 | Bishop et al. |
| 5,608,909 A | * | 3/1997 | Atkinson et al. ........... 719/315 |
| 5,752,264 A | | 5/1998 | Blake et al. |
| 5,893,140 A | * | 4/1999 | Vahalia et al. ............. 711/118 |
| 6,064,406 A | | 5/2000 | Atkinson et al. |
| 6,119,151 A | | 9/2000 | Cantrell et al. |
| 6,141,737 A | | 10/2000 | Krantz et al. |
| 6,263,402 B1 | | 7/2001 | Rönstrom et al. |
| 6,792,436 B1 | * | 9/2004 | Zhu et al. .................... 707/203 |
| 6,813,690 B1 | * | 11/2004 | Lango et al. ................ 711/118 |

OTHER PUBLICATIONS

Burns et al., May 1–5, 2000, IEEE, pp. 155-162.*

* cited by examiner

Primary Examiner—Donald Sparks
Assistant Examiner—Hashem Farrokh
(74) Attorney, Agent, or Firm—Sughrue Mion, PLLC

(57) ABSTRACT

A method for performing efficient caching through an enumeration process is provided. The objects residing on the storage medium are cached in the order that these objects are kept in the directory of the storage medium. As a result, the directory content is enumerated in the cache. Therefore, the cache does not have to be associated with the server layout. Moreover, it is further possible to support a hierarchy of distributed caches using the disclosed invention.

52 Claims, 6 Drawing Sheets

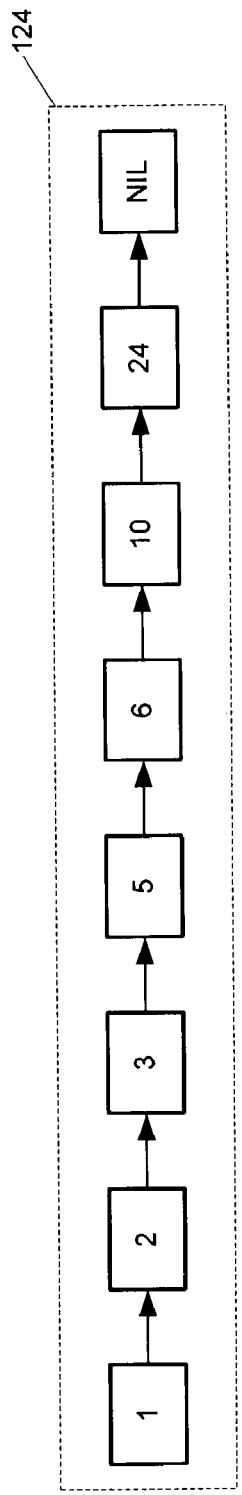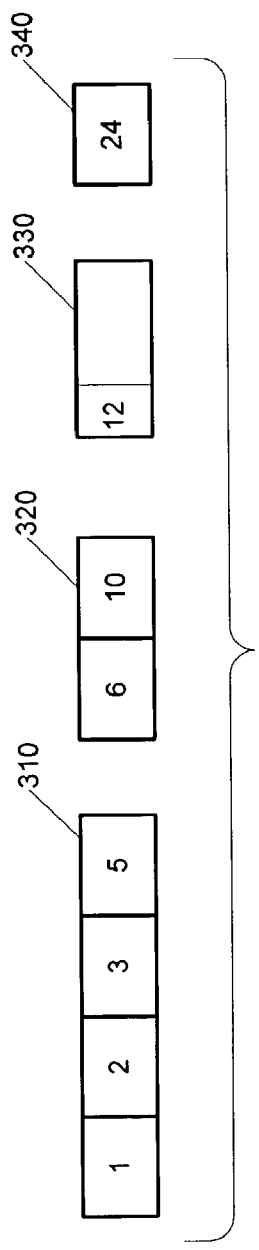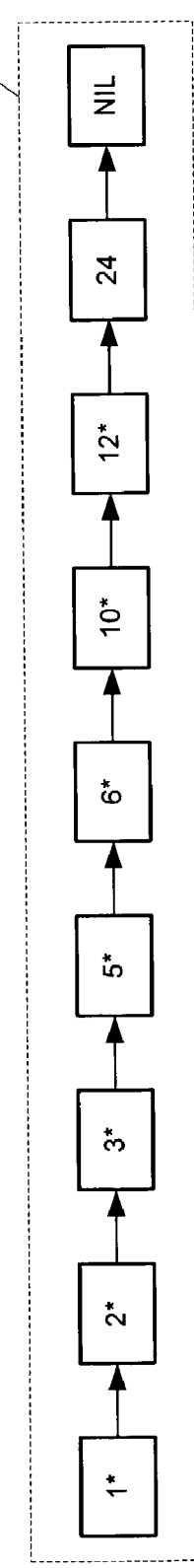
FIG. 3A
FIG. 3B
FIG. 3C

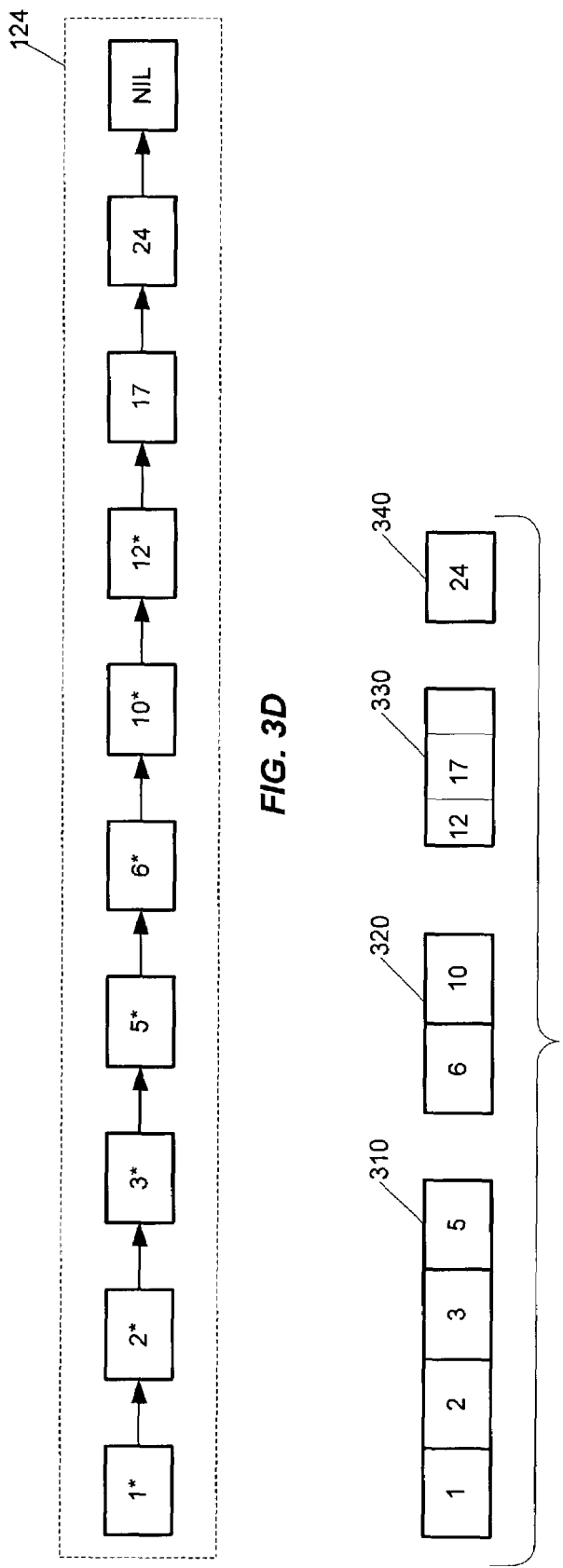
FIG. 3D
FIG. 3E
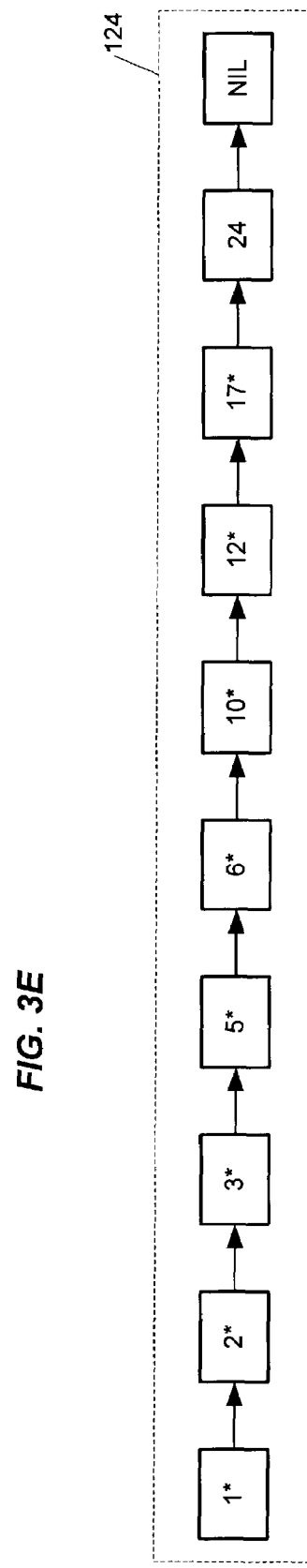
FIG. 3F

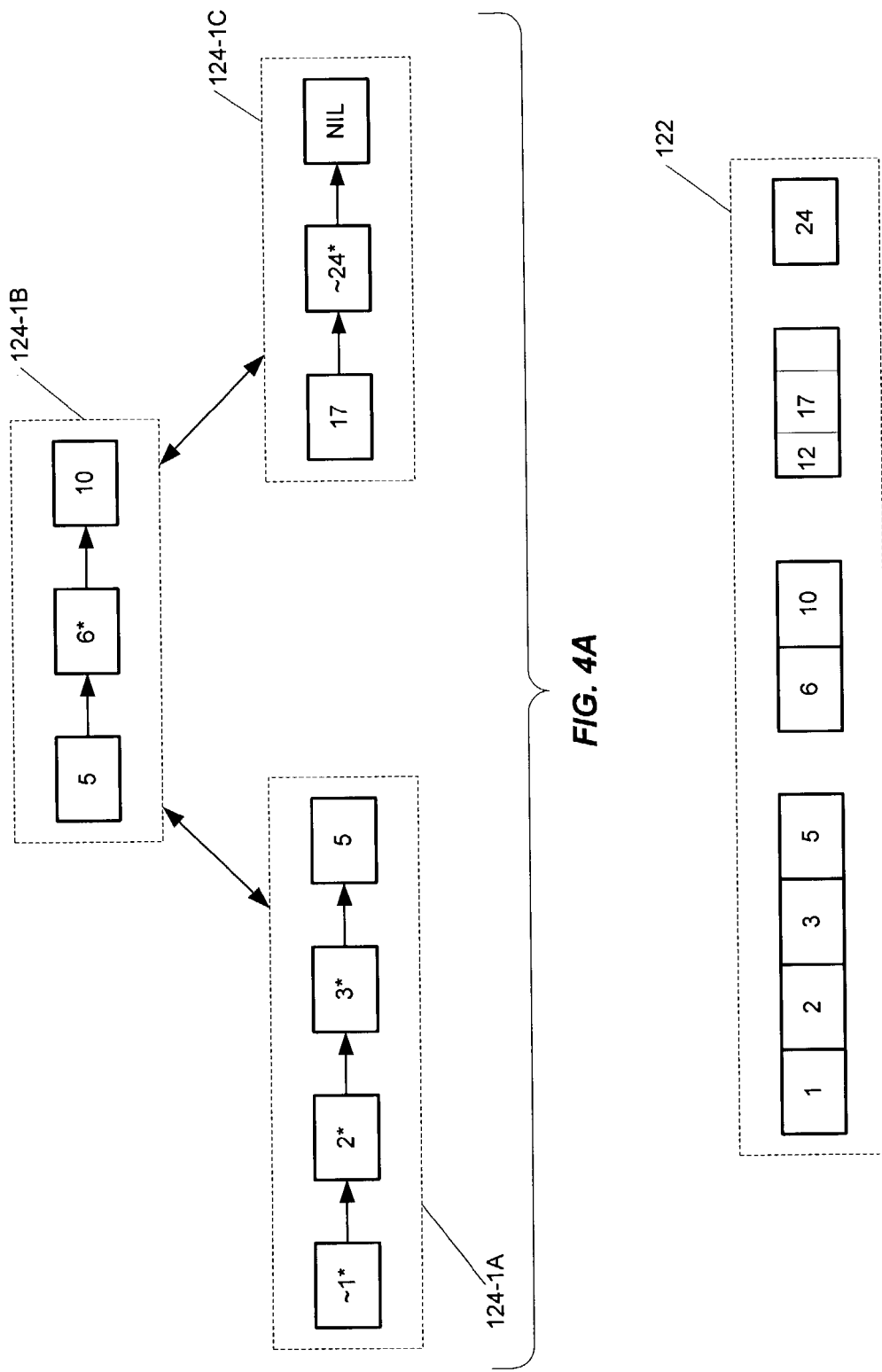

METHOD FOR EFFICIENT CACHING AND ENUMERATING OBJECTS IN DISTRIBUTED STORAGE SYSTEMS

BACKGROUND OF THE PRESENT INVENTION

1. Technical Field of the Invention

The present invention relates generally to the field of cache memory, and more specifically, to caching and enumerating data objects in distributed file systems.

2. Description of the Related Art

There will now be provided a discussion of various topics to provide a proper foundation for understanding the present invention.

Computer workstations have increased in power and storage capacity. Workstations were originally used by a single operator to perform one or more isolated tasks. The increased deployment of workstations to many users within an organization has created a need to communicate between workstations and share data between users. This has led to the development of distributed file system architectures.

A typical distributed file system comprises a plurality of clients and servers interconnected by a local area network (LAN) or wide area network (WAN). The sharing of files across such networks has evolved over time. The simplest form of sharing data allows a client to request files from a remote server. Data is then sent to the client and any changes or modifications to the data are returned to the server. Appropriate locks are created so that one client does not change the data in a file being manipulated by another client.

Distributed file systems improve on the efficiency of processing of distributed files by creating a file cache at each client location that accesses server data. This cache is referenced by client applications and only a cache miss causes data to be fetched from the server. Caching of data reduces network traffic and speeds response time at the client.

In order to decrease the latency for information access, some implementations use distributed caches. Distributed caches appear to provide an opportunity to combat this latency allowing users to benefit from data fetched by other users. The distributed architectures allow clients to access information found in a common place. Distributed caches define a hierarchy of data caches in which data access proceeds as follows: a client sends a request to a cache, and if the cache contains the data requested by the client, the ache sends back the requested data. Otherwise, the cache may request its neighbors for the data, but if none of the neighbors serve the request, then the cache sends the request to its parent. This process recursively continues down the hierarchy until data is fetched from the server. One example of such a distributed cache is shown by Nir Peleg in PCT patent application number US01/19567, entitled "Scalable Distributed Hierarchical Cache", assigned to common assignee and is hereby referenced for all it discloses.

Caches hold files in the same way that they are saved in the servers, thus caches must have the same file layout as servers. Typically, servers arrange the files in blocks, and therefore, the cache's files are also arranged in blocks. In order to save a file in the cache, the entire block must be saved. This causes a waste of cache resources.

Enumeration is a process in which the client enumerates files or objects in the server, i.e., listing the files on a server along with their attributes. For example, the "ls" command used in UNIX operating systems lists the content of the server. In a file system having a huge number of files the listing operation consumes a considerable amount of time.

Therefore, it would be an advantageous to have a method for caching and enumerating data, namely caching the server objects in a defined order. It would be further advantageous if a caching method enables the use of caches that are not associated with the server layout.

SUMMARY OF THE PRESENT INVENTION

The present invention has been made in view of the above circumstances and to overcome the above problems and limitations of the prior art.

Additional aspects and advantages of the present invention will be set forth in part in the description that follows and in part will be obvious from the description, or may be learned by practice of the present invention. The aspects and advantages of the present invention may be realized and attained by means of the instrumentalities and combinations particularly pointed out in the appended claims.

A first aspect of the present invention provides a method for enumeration of objects for the purpose of caching in a distributed storage system, wherein the distributed storage system comprises at least one client and at least one storage node with a storage means and a cache. The enumeration method comprises receiving from the client the address of the first object with which to begin an enumeration process and scanning the cache starting from the first object. While scanning the cache, if a synchronized object is found, then the method provides for copying the synchronized object to a temporary buffer that stores a plurality of enumerated objects. Also, if while scanning the cache, if an unsynchronized object is found, then the method provides for fetching the unsynchronized object from the storage means, and updating the cache with the unsynchronized object. The method further comprises adding the unsynchronized object fetched from the storage means to the plurality of enumerated objects stored in the temporary buffer, and then returning the plurality of enumerated objects to the client from the temporary buffer.

The storage node could be a host computer, a server, a file server, a file system, a location independent file system or a geographically distributed computer system, and the cache could be a skip-list based cache, a balance tree based cache or a hash file based cache.

The enumeration of objects is triggered by the client. A synchronized object is an object comprising at least one file attribute, and a pointer that points to the location of the file in a directory of the storage means. In the invention, a synchronized object is part of a sequence of synchronized objects. Synchronized objects are marked by using a flag. An unsynchronized object is at least one of a new object and a modified object, and unsynchronized objects are not part of a sequence of synchronized objects.

The method provides for scanning the cache through the last object stored in the cache. The method also provides for fetching unsynchronized objects from the storage means and saving them in the cache, and the unsynchronized object is marked as synchronized. Saving the unsynchronized object comprises allocating memory in the cache to fit the size of the unsynchronized object.

A second aspect of the present invention provides a computer executable code for performing a process of enumeration of objects for the purpose of caching in a distributed storage system, wherein the distributed storage system comprises at least one client and at least one storage node having a storage means and a cache. The executable code comprises a first executable portion for receiving from the client the address of the first object with which to begin the enumerating process, and a second executable portion for scanning the objects in the cache starting from the first object. The executable code further comprises a third executable portion for copying a synchronized object to a temporary buffer that stores a plurality of synchronized objects if a synchronized object is found while scanning, and a fourth executable portion for fetching an unsynchronized object from the storage means if an unsynchronized object is found while scanning. The executable code further comprises a fifth executable portion for updating the cache with the unsynchronized object, and a sixth executable portion for adding the unsynchronized object fetched from the storage means to the plurality of enumerated objects stored in the temporary buffer. The executable code also comprises a seventh executable portion for returning the plurality of enumerated objects to the client from the temporary buffer.

The computer executable code further comprises an eighth executable portion for saving the unsynchronized object fetched from the storage means in the cache, and a ninth executable portion for marking the unsynchronized object as synchronized. The computer executable code saves unsynchronized objects by allocating memory in the cache to fit the size of the object.

A third aspect of the invention provides a storage server adapted to perform enumeration of data objects for the purpose of caching, wherein the storage server being connected to at least one client via a network. The storage server comprises a cache adapted to store variable size objects and further capable of holding objects in at least a linked sequence, and a storage means capable of storing and retrieving the objects, the objects further being able to be accessed through a directory associated with the storage means. The storage server adapted to receive from the client the address of the first object with which to begin the enumerating process and scan the objects in the cache starting from the first object. The storage server is further adapted to copy a synchronized object to a temporary buffer that stores a plurality of enumerated objects if, while scanning, a synchronized object is found, and to fetch an unsynchronized object from the storage means if, while scanning, an unsynchronized object is found. The storage server is further adapted to update the cache with the unsynchronized object and add the unsynchronized object fetched from the storage means to the plurality of enumerated objects stored in the temporary buffer. The storage server is also adapted to return the plurality of enumerated data objects the client from the temporary buffer. The network could be a local area network (LAN), a wide area network (WAN) or a geographically distributed network. The storage server could be a host computer, a file server, a file system, a location independent file system or part of a geographically distributed computer system.

A fourth aspect of the invention provides a method for sequencing objects contained in at least two hierarchically connected caches in a distributed storage system, wherein the distributed storage system comprises a storage node and a client. The storage node has a cache with a variable size block capable of holding objects in at least a linked sequence, and a storage means. The method comprises checking if the last and the first objects in the connected caches are identical. If the last object and the first objects are not identical, then fetching objects from the storage means until a sequence is created; otherwise, if the last object and first objects are identical, then marking the first object and the last object as synchronized. Fetching objects from storage comprises caching the missing objects in one of the caches, and marking the missing objects as synchronized objects. When the missing objects are cached, they are saved in a sequence of synchronized objects. Saving the objects comprises allocating memory to fit the size of each of the objects.

A fifth aspect of the present invention provides a computer executable code for sequencing objects contained in at least two hierarchically connected caches in a distributed storage system, wherein the distributed storage system comprises a storage node and a client. The storage node has a cache with a variable size block capable of holding objects in at least a linked sequence, and a storage means. The executable code comprises a first executable code portion for checking if the last and the first objects in the connected caches are identical, and a second executable code portion for fetching objects from the storage means until a sequence is created if the last object and the first objects are not identical. The computer executable code further comprises a third executable code portion for marking the first object and the last object as synchronized if the last object and first objects are identical. Fetching objects from storage further comprises caching the missing objects in the cache, and marking the missing objects as synchronized objects. When the missing objects are cached, they are saved in a sequence of synchronized objects. Saving the objects comprises allocating memory to fit the size of each of the objects.

The above aspects and advantages of the present invention will become apparent from the following detailed description and with reference to the accompanying drawing figures.

BRIEF DESCRIPTION OF THE DRAWINGS

The accompanying drawings, which are incorporated in and constitute a part of this specification, illustrate the present invention and, together with the written description, serve to explain the aspects, advantages and principles of the present invention. In the drawings.

FIGS. 3A–3F illustrate an exemplary use of the caching method according to the present invention; and FIGS. 4A–4C illustrate another exemplary use of the caching method according to the present invention.

DETAILED DESCRIPTION OF THE PRESENT INVENTION

Prior to describing the aspects of the present invention, some details concerning the prior art will be provided to facilitate the reader's understanding of the present invention and to set forth the meaning of various terms.

As used herein, the term "computer system" encompasses the widest possible meaning and includes, but is not limited to, standalone processors, networked processors, mainframe processors, and processors in a client/server relationship. The term "computer system" is to be understood to include at least a memory and a processor. In general, the memory will store, at one time or another, at least portions of executable program code, and the processor will execute one or more of the instructions included in that executable program code.

As used herein, the terms "predetermined operations," the term "computer system software" and the term "executable code" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

As used herein, the terms "media," "medium" or "computer-readable media" include, but is not limited to, a diskette, a tape, a compact disc, an integrated circuit, a cartridge, a remote transmission via a communications circuit, or any other similar medium useable by computers. For example, to distribute computer system software, the supplier might provide a diskette or might transmit the instructions for performing predetermined operations in some form via satellite transmission, via a direct telephone link, or via the Internet.

Although computer system software might be "written on" a diskette, "stored in" an integrated circuit, or "carried over" a communications circuit, it will be appreciated that, for the purposes of this discussion, the computer usable medium will be referred to as "bearing" the instructions for performing predetermined operations. Thus, the term "bearing" is intended to encompass the above and all equivalent ways in which instructions for performing predetermined operations are associated with a computer usable medium.

A detailed description of the aspects of the present invention will now be given referring to the accompanying drawings.

The present invention provides a method for performing efficient caching through an enumerating process. According to the present invention, the objects on the storage medium are cached in the order that these objects are kept in the storage medium's directory. As a result, the directory content is enumerated in the cache. Therefore, the cache does not have to be associated with the server layout.

Figure 1:
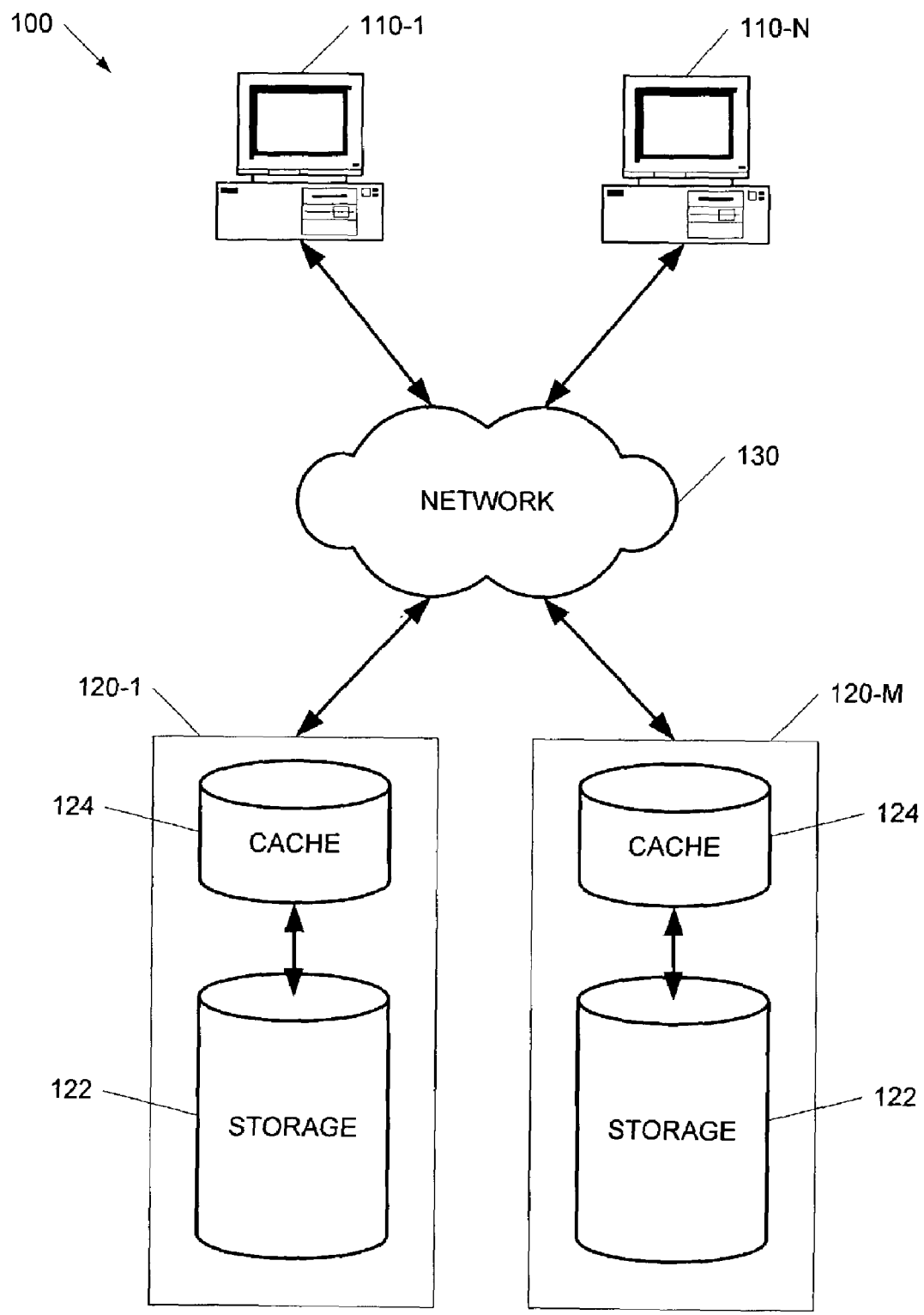
FIG. 1 illustrates an exemplary distributed storage network.

Referring to FIG. 1, a schematic diagram of an exemplary distributed file system 100 is shown. The distributed file system 100 comprises client 110-1 through 110-n, where n is the number of clients. The distributed file system further comprises storage nodes 120-1 through 120-m, where m is the number of storage nodes. The storage node 120-1 comprises a storage medium 122 and a cache 124. The client 110-1 and the storage node 120-1 are connected through a standard network 130. The standard network 130 includes but is not limited to a local area network (LAN), or a wide area network (WAN).

The cache 124 is a skip-list based cache. A detailed explanation of a skip list based cache is provided in U.S. application Ser. No. 10/122,183, entitled "An Apparatus and Method for a Skip-List Based Cache", by Shahar Frank, assigned to common assignee and which is hereby incorporated by reference for all that it discloses. In a skip-list based cache, the data is kept according to a defined order, i.e., sorted according to a designated key. In contrast, in traditional cache implementations, a key is used to access the data in cache 124.

The storage medium 122 stores files and objects accessed through a directory. Usually, directories are implemented using hash-tables, balance trees, arrays or combinations thereof. Directories usually include entries arranged in buckets or blocks. An entry includes the file attributes, and a pointer points to the location of the file. Each entry has a different size and each bucket includes a different number of entries. The storage medium 122 includes, but is not limited to, a server, a host server, a file server, etc.

The caching method is performed whenever data enumeration is required. Data enumeration is required each time a client 110-1 executes one of the following operations: insert, remove, list and lookup. In order to cache and enumerate the directory of the storage medium 122, the present invention operates as follows. First, cache 124 receives from a client 110-1 the address of the first object with which to begin the enumeration. Typically, this address refers to the first object in the directory. The cache 124 checks if this object is flagged as synchronized. An object in cache 124 is considered as synchronized if it is part of a sequence, i.e., if the object is within a series of objects fetched from the storage medium 122. A flag marks a synchronized object.

An unsynchronized object is a new object or a modified object. If the first object is not synchronized or is not found in the cache 124, then data is fetched from the storage medium 122. In addition, the last and the first objects of the storage medium 122 are flagged in the cache 124. For that purpose, the cache 124 sends to the storage medium 122 the address that represents the first object to be fetched. This address specifies the location of the object in the directory, and it is not the physical address in the storage medium 122. The storage medium 122 provides the cache 124 with a set of entries starting from the first object. The number of objects sent back to the cache 124 varies and depends on the size of the entries in the directory, as well as the buffer size of the storage medium 122.

If the first object is synchronized, then the cache 124, by following through the skip list, checks whether the other objects in the cache 124 are synchronized. If an unsynchronized object is found while scanning the skip-list, the cache 124 fetches data from the storage medium 122 starting from the first unsynchronized object. The cache 124, upon receiving the sequence of entries from the storage medium 122, joins this sequence with the objects that were scanned. After joining the two sequences, the cache 124 flags the objects belonging to the added sequence as synchronized. The added sequence is considered as synchronized and is sent to the client 110-1.

An example of the process is provided below. The client 110-1 may instruct the cache 124 to continue the enumeration process from the last enumerated object, by sending to the cache 124 the address of this object. In order that the cache 124 maintains consistency with the storage medium 122, any change in the content of the storage medium 122 is reported to the cache 124. However, due to the caching technique of the present invention, changing the files' location in the storage medium 122 does not require reporting to the cache 124. The cache 124 flags the entire set of objects as unsynchronized if one or more of the objects were deleted.

The cached objects are saved in order, i.e., a synchronized object indicates that it keeps an ordered relation with its neighbors' objects. In addition, for each object saved in the cache 124, the cache 124 allocates memory according to the object's size. This reduces the use of cache resources. It should be noted that a person skilled in the art could easily adapt this process to use other types of caches that enable the ability to maintain objects in order. For example, any balance tree based cache may serve this purpose.

Figure 2:
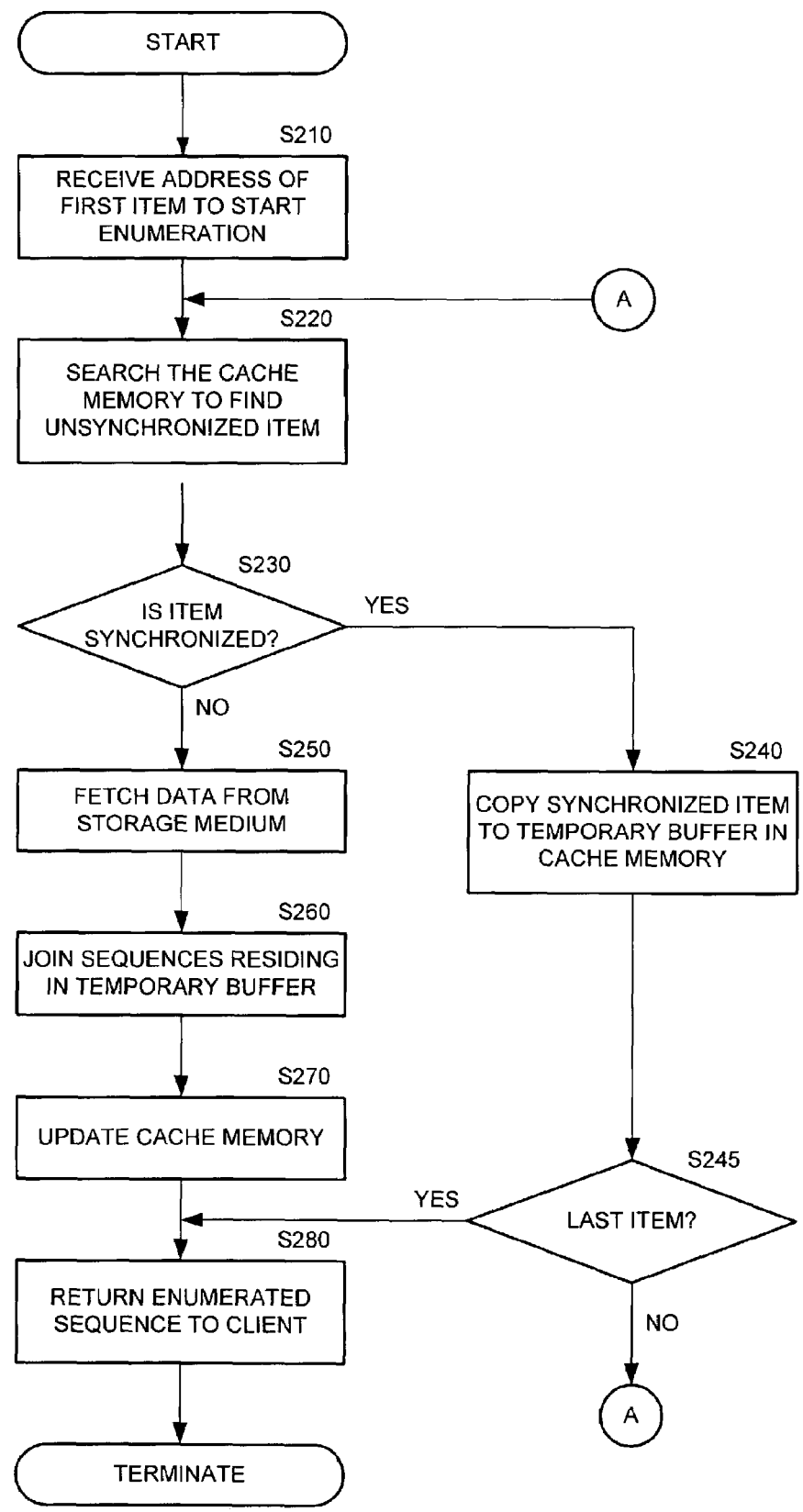
FIG. 2 is an exemplary flowchart describing an embodiment of the caching method according to the present invention.

Referring to FIG. 2, an exemplary flowchart for caching through enumeration is shown. At S210, the cache 124 receives from the client 110-1 the address of the first object with which to begin the enumeration. At S220, the cache 124, by means of following through a skip list, searches for objects flagged as unsynchronized. If it is determined at S230 that an object is synchronized, then the execution continues at S240. At S240, the cache 124 copies the synchronized object to a temporary buffer. The temporary buffer is located in the cache 124 and it is used to hold the synchronized objects that have been scanned. At S245, the cache 124 checks if the last object that was copied to the temporary buffer is the last object in the cache 124. If so, the cache 124 returns the sequence found in the temporary buffer to client 110-1.

Otherwise, the process continues at S220. If it is determined at S230 that the object is unsynchronized, then execution continues at S250 where data is fetched from the directory of the storage medium 122. The data fetched from the directory includes a set of entries starting from the object that preceded the unsynchronized object found. The cache 124 provides the storage medium 122 with the address of the first object in the sequence. At S260, the sequence of entries is added to the synchronized sequence residing in the temporary buffer. At S270, the cache 124 updates the joined sequence in its memory and flags the objects as synchronized. Finally, at S280, the cache 122 sends to the client 110-1 the joined synchronized sequence.

Referring to FIGS. 3A–3F, an exemplary use of the present invention is illustrated. FIG. 3A illustrates the content of the cache 124 and the directory of the storage medium 122. The directory includes four blocks 310 through 340, as illustrated in FIG. 3B. The cache 124 includes the following objects "1", "2", "3", "5", "6", "10" and "24" kept in increasing order. Objects marked with "*" are synchronized objects.

Client 110-1 triggers the process of enumeration by requesting to enumerate the content of the storage medium 122. The client 110-1 provides the cache 124 with the address of the first object with which to begin the enumeration. Here, the first object is "1". The cache 124 searches for unsynchronized objects starting from object "1". The first unsynchronized object found in the cache 124 is "6". The cache 124 provides the storage medium 122 with the address of object "5". In this example, the storage medium 122 returns only four entries "5", "6", "10", and "12". The number of entries that are sent to the cache 124 is based on the size of each entry, and the capacity of the buffer of storage medium 122. The cache 124 joins the sequence with the synchronized sequence "1", "2","3" and "5". The object "12" was not originally in the cache 124, thus it is added to the memory of the cache 124. The cache 124 allocates memory to fit the size of object "12", i.e., copying only object "12" and not block 330. This caching technique is significantly different from prior art approaches, which allocate memory to fit the block size. Usually, the block size is much larger than the entry (i.e., object) size, hence, the preferred approach saves memory resources. The updated cache is shown in FIG. 3C. As part of the enumeration process, the cache 124 returns to the client 110-1 the sequence "1", "2", "3", "5", "6", "10", and "12".

FIG. 3D shows the content of the cache 124 after inserting an object represented by key "17". The directory of the storage medium 122 includes four blocks 310 through 340, as illustrated in FIG. 3E, with the object is inserted to block 330. Object "17" is flagged as unsynchronized. In order to continue the enumeration process, client 110-1 provides the cache 124 with the address of object "12", which is the last enumerated object. The cache 124 continues to execute the process as described above. The updated cache, after enumeration, is shown in FIG. 3F. As can be seen in FIG. 3F, the cache 124 includes an enumerated sequence that corresponds to the objects of the storage medium 122. Now, by caching an enumerated data in the cache 124, execution of an "is" command, i.e., a request for a list operation, will result in the reading of the copy in the cache 124 of the directory of the storage medium 122.

In accordance with an embodiment of the present invention, the caching method may use, for sequencing, objects that belong to a plurality of caches, and that are hierarchically connected to each other. This provides the ability to maintain objects in sequence, where they may be located in different caches. For that objective, each cache has to hold the last and the first object of its neighbor cache. That is, each cache maintains at most two mutual objects.

As illustrated in FIG. 4A, three caches 124-1A through 124-1C are hierarchically connected to each other. The cache 124-1A includes objects "1", "2","3", and "5", the cache 124-1B includes objects "5", "6", and "10", and the cache 124-1C includes objects "17" and "24". Synchronized objects are marked by an "*", while the first and the last objects of the storage medium 122 are marked using "~". FIG. 4B also shows the content of storage medium 122. Objects "5", "10", and "17", are considered as unsynchronized objects, because their preceding or succeeding objects are found in other caches. For example, in the storage medium 122, the succeeding object of object "5" is object "6", but object "6" is contained in the cache 124-1A, and object "6" is contained in the cache 124-1B. For that reason, these objects are not considered as in sequence.

Figure 4C:
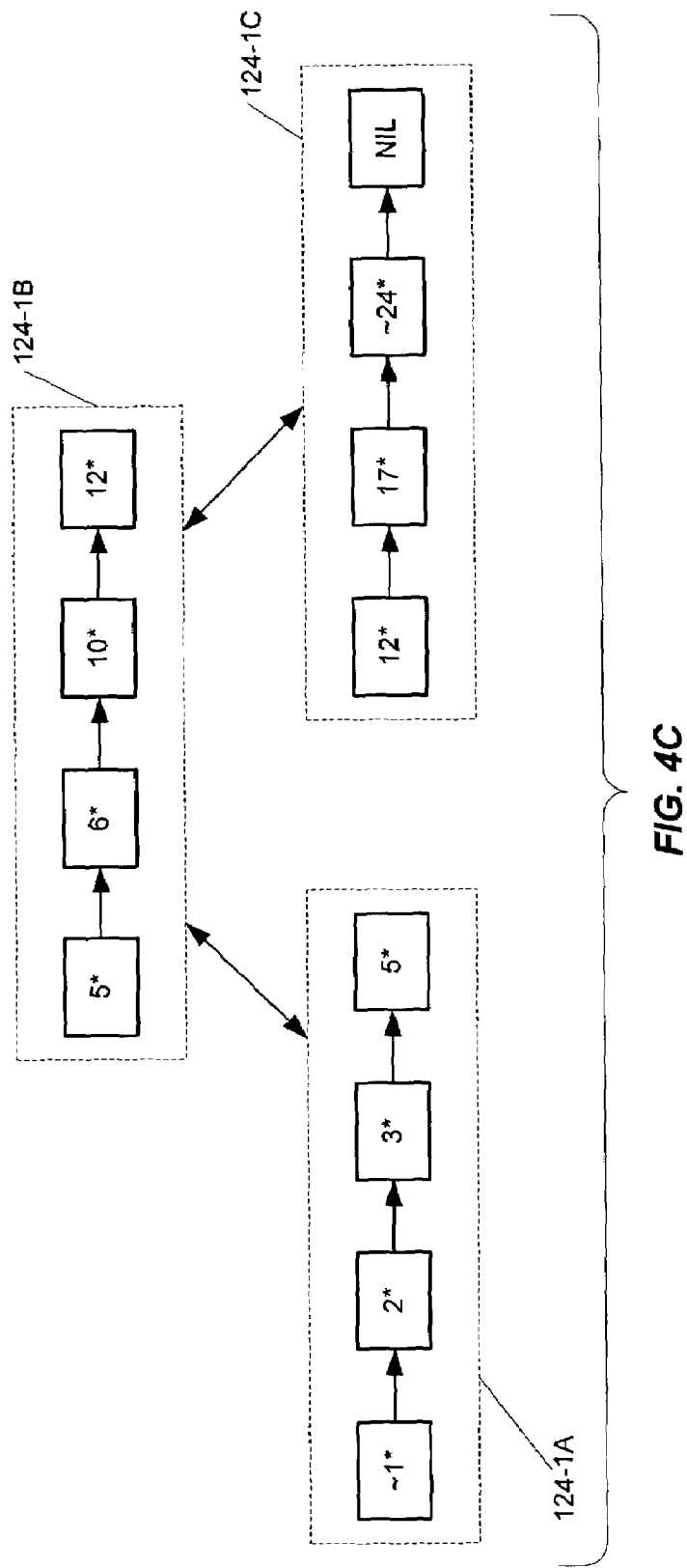

The process for sequencing starts with object "1" contained in the cache 124-1A. The objects "1", "2" and "3" are all synchronized. Since object "5" is not the last object of the storage medium 122, the enumerating process continues by scanning the objects in the cache 124-1B. The first object in cache 124-1B (i.e., object "5") is the last object in the cache 124-1A (i.e., object "5"). This matching indicates that the objects residing in the caches 124-1A and 124-1B are in sequence. Hence, the object "5" in caches 124-1A and 124-1B can be marked as synchronized object. The process continues by scanning the objects of the cache 124-1B. The object "10" is not flagged as synchronized because is not the last object in storage medium 122, and therefore, the sequencing process continues in the cache 124-1C. The first object in the cache 124-1C (i.e., object "17") is different from the last object in the cache 124-1B (i.e., object "10"). This dissimilarity indicates that the objects of the caches 124-1B and 124-1C are not in sequence, since object "12" is not found neither in the cache 124-1B nor in the cache 124-1C. Therefore, the cache 124-1C fetches from the storage medium 122 the unsynchronized object, i.e., the missing object "12". The object "12" is now saved in the caches 124-1B and 124-1C and is flagged as synchronized. The outcome of the above process is shown in FIG. 4C.

The foregoing description of the aspects of the present invention has been presented for purposes of illustration and description. It is not intended to be exhaustive or to limit the present invention to the precise form disclosed, and modifications and variations are possible in light of the above teachings or may be acquired from practice of the present invention. The principles of the present invention and its practical application were described in order to explain the to enable one skilled in the art to utilize the present invention in various embodiments and with various modifications as are suited to the particular use contemplated.

Thus, while only certain aspects of the present invention have been specifically described herein, it will be apparent that numerous modifications may be made thereto without departing from the spirit and scope of the present invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A method for enumeration of objects for the purpose of caching in a distributed storage system, said distributed storage system comprising at least one client and at least one storage node, said storage node comprising at least a storage means and a cache, said method comprises:
   receiving from said client the address of the first object with which to begin an enumeration process;
   scanning said cache starting from said first object;
   while scanning said cache, if a synchronized object is found, then copying said synchronized object to a temporary buffer that stores a plurality of enumerated objects;
   while scanning said cache, if an unsynchronized object is found, then fetching said unsynchronized object from said storage means;
   updating said cache with said unsynchronized object;
   adding said unsynchronized object fetched from said storage means to said plurality of enumerated objects stored in said temporary buffer; and
   returning said plurality of enumerated objects to said client from said temporary buffer.

2. The method of claim 1, wherein said storage node is at least one of a host, a server, a file server, a file system, a location independent file system and a geographically distributed computer system.

3. The method of claim 1, wherein said cache is least one of a skip-list based cache, a balance tree based cache and a hash file based cache.

4. The method of claim 1, wherein said temporary buffer comprises a portion of said cache.

5. The method of claim 1, wherein said enumeration of objects is triggered by said client.

6. The method of claim 1, wherein said synchronized object is part of a sequence of synchronized objects.

7. The method of claim 1, wherein said synchronized object is marked by using a flag.

8. The method of claim 1, wherein said unsynchronized object is at least one of a new object and a modified object.

9. The method of claim 1, wherein said unsynchronized object is not part of a sequence of synchronized objects.

10. The method of claim 1, wherein scanning said cache is performed through the last object stored in said cache.

11. The method of claim 1, wherein said method further comprises:
    saving said unsynchronized object fetched from said storage means in said cache; and
    marking said unsynchronized object as synchronized.

12. The method of claim 11, wherein saving said unsynchronized object comprises allocating memory in said cache to fit the size of said unsynchronized object.

13. The method of claim 1, wherein said first object is the first object stored in said storage means.

14. The storage server of claim 1, wherein said synchronized object is an object comprising at least one file attribute, and a pointer that points to the location of said file in a directory of said storage means.

15. A computer executable code, stored in a computer medium, for performing a process of enumeration of objects for the purpose of caching in a distributed storage system, said distributed storage system comprising at least one client and at least one storage node, said storage node comprising at least a storage means and a cache, said executable code comprises:
    a first executable portion for receiving from said client the address of the first object with which to begin said enumerating process;
    a second executable portion for scanning the objects in said cache starting from said first object;
    a third executable portion for copying a synchronized object to a temporary buffer that stores a plurality of synchronized objects if a synchronized object is found while scanning;
    a fourth executable portion for fetching an unsynchronized object from said storage means if an unsynchronized object is found while scanning;
    a fifth executable portion for updating said cache with said unsynchronized object;
    a sixth executable portion for adding said unsynchronized object fetched from said storage means to said plurality of enumerated objects stored in said temporary buffer; and
    a seventh executable portion for returning said plurality of enumerated objects to said client from said temporary buffer.

16. The computer executable code of claim 15, wherein said storage node is at least one of a host, a server, a file server, a file system, a location independent file system and a geographically distributed computer system.

17. The computer executable code of claim 15, wherein said cache is least one of a skip-list based cache, a balance tree based cache and a hash file based cache.

18. The computer executable code of claim 15, wherein said temporary buffer comprises a portion of said cache.

19. The computer executable code of claim 15, wherein said enumeration of objects is triggered by said client.

20. The computer executable code of claim 15, wherein said synchronized object is part of a sequence of synchronized objects.

21. The computer executable code of claim 15, wherein said synchronized object is marked by using a flag.

22. The computer executable code of claim 15, wherein said unsynchronized object is at least one of a new object and a modified object.

23. The computer executable code of claim 15, wherein said unsynchronized object is not part of a sequence of synchronized objects.

24. The computer executable code of claim 15, wherein scanning said cache is performed through the last object in said cache.

25. The computer executable code of claim 15, further comprising:
    an eighth executable portion for saving said unsynchronized object fetched from said storage means in said cache; and
    a ninth executable portion for marking said unsynchronized object as synchronized.

26. The computer executable code of claim 25, wherein saving said unsynchronized object comprises allocating memory in said cache to fit the size of said object.

27. The computer executable code of claim 15, wherein said first object is the first object in said storage means.

28. The computer executable code of claim 15, wherein said synchronized object is an object comprising at least one file attribute, and a pointer that points to the location of said file in a directory of said storage means.

29. A storage server adapted to perform enumeration of data objects for the purpose of caching, said storage server being connected to at least one client via a network, said storage server comprising:
- a cache adapted to store variable size objects and further capable of holding objects in at least a linked sequence; and
- a storage means capable of storing and retrieving said objects, said objects further being able to be accessed through a directory associated with said storage means, said storage server adapted to:
- receive from said client the address of the first object with which to begin said enumerating process;
- scan the objects in said cache starting from said first object;
- copy a synchronized object to a temporary buffer that stores a plurality of enumerated objects if, while scanning, a synchronized object is found;
- fetch an unsynchronized object from said storage means if, while scanning, an unsynchronized object is found;
- update said cache with said unsynchronized object;
- add said unsynchronized object fetched from said storage means to said plurality of enumerated objects stored in said temporary buffer; and
- return said plurality of enumerated data objects said client from said temporary buffer.

30. The storage server of claim 29, wherein said network is at least one of a local area network (LAN), a wide area network (WAN) and a geographically distributed network.

31. The storage server of claim 29, wherein said storage server is at least one of a host, a file server, a file system and a location independent file system.

32. The storage server of claim 29, wherein said storage server is at least part of a geographically distributed computer system.

33. The storage server of claim 29, wherein said cache is least one of a skip-list based cache, a balance tree based cache and a hash file based cache.

34. The storage server of claim 29, wherein said synchronized object is part of a sequence of synchronized objects.

35. The storage server of claim 29, wherein said synchronized object is marked by using a flag.

36. The storage server of claim 29, wherein said unsynchronized object is at least one of a new object and a modified object.

37. The storage server of claim 29, wherein said unsynchronized object is not part of a sequence of synchronized objects.

38. The storage server of claim 29, wherein scanning said cache is performed through the last object in said cache.

39. The storage server of claim 29, wherein said storage server is further adapted to:
- save said unsynchronized object fetched from said storage means in said cache; and
- mark said unsynchronized object as synchronized.

40. The storage server of claim 39, wherein saving said unsynchronized object comprises allocating memory in said cache to fit the size of said object.

41. The storage server of claim 29, wherein said first object is the first object in said storage means.

42. The storage server of claim 29, wherein said synchronized object is an object that includes at least one file attribute, and a pointer that points to the immediately location of said file in a directory of said storage means.

43. A method for sequencing objects contained in at least two hierarchically connected caches in a distributed storage system, said distributed storage system comprising at least one storage node and at least one client, said storage node further comprising at least a cache having a variable size block, further capable of holding objects in at least a linked sequence, and a storage means, said method comprises:
- checking if a last and a first objects in said connected caches are identical;
- if said last object and said first objects are not identical, then fetching objects from said storage means until a sequence is created; and
- if said last object and first objects are identical, then marking said first object and said last object as synchronized.

44. The method of claim 43, wherein fetching objects from storage further comprises:
- caching said missing objects in one of said caches; and
- marking said missing objects as synchronized objects.

45. The method of claim 44, wherein caching said missing objects further comprises saving said objects in a sequence of synchronized objects.

46. The method of claim 45, wherein saving said objects further comprises allocating memory to fit the size of each of said objects.

47. The method of claim 44, wherein said synchronized object is part of a sequence of synchronized objects.

48. A computer executable code, stored in a computer medium, for sequencing objects contained in at least two hierarchically connected caches in a distributed storage system, said distributed storage system comprising at least one storage node and at least one client, said storage node further comprising at least a cache having a variable size block, further capable of holding objects in at least a linked sequence, and a storage means, said executable code comprising:
- a first executable code portion for checking if a last and a first objects in said connected caches are identical;
- a second executable code portion for fetching objects from said storage means until a sequence is created if said last object and said first objects are not identical; and
- a third executable code portion for marking said first object and said last object as synchronized if said last object and first objects are identical.

49. The computer executable code of claim 48, wherein fetching objects from storage further comprises:
- caching said missing objects in said cache; and
- marking said missing objects as synchronized objects.

50. The computer executable code of claim 48, wherein caching said missing objects further comprises saving said objects in a sequence.

51. The computer executable code of claim 50, wherein saving said objects further comprises allocating memory to fit the size of each of said objects.

52. The computer executable code of claim 50, wherein said synchronized object is part of a sequence of synchronized objects.

* * * * *